United States Patent
Lin et al.

(10) Patent No.: US 10,225,556 B2
(45) Date of Patent: Mar. 5, 2019

(54) METHOD AND APPARATUS OF ENCODING OR DECODING CODING UNITS OF A VIDEO CONTENT IN A PALETTE CODING MODE USING AN ADAPTIVE PALETTE PREDICTOR

(71) Applicant: INDUSTRIAL TECHNOLOGY RESEARCH INSTITUTE, Zhudong Township (TW)

(72) Inventors: Ching-Chieh Lin, Taipei (TW); Yao-Jen Chang, Hsinchu (TW); Chun-Lung Lin, Taipei (TW); Jih-Sheng Tu, Yilan (TW)

(73) Assignee: INDUSTRIAL TECHNOLOGY RESEARCH INSTITUTE, Zhudong Township (TW)

( * ) Notice: Subject to any disclaimer, the term of this patent is extended or adjusted under 35 U.S.C. 154(b) by 258 days.

(21) Appl. No.: 15/177,203

(22) Filed: Jun. 8, 2016

(65) Prior Publication Data

US 2016/0360207 A1 Dec. 8, 2016

Related U.S. Application Data

(60) Provisional application No. 62/172,256, filed on Jun. 8, 2015.

(51) Int. Cl.
*H04N 19/15* (2014.01)
*H04N 19/136* (2014.01)
(Continued)

(52) U.S. Cl.
CPC ......... *H04N 19/136* (2014.11); *H04N 19/102* (2014.11); *H04N 19/124* (2014.11);
(Continued)

(58) Field of Classification Search
CPC ...... H04N 19/136; H04N 19/96; H04N 19/61; H04N 19/186; H04N 19/154; H04N 19/176; H04N 19/182; H04N 19/134
(Continued)

(56) References Cited

U.S. PATENT DOCUMENTS

2006/0167692 A1 7/2006 Basu et al.
2014/0301475 A1 10/2014 Guo et al.
(Continued)

FOREIGN PATENT DOCUMENTS

CN 104301737 A 1/2015
CN 105323583 A 2/2016
(Continued)

OTHER PUBLICATIONS

Chang et al., "Non-CE1: On Maximum Palette Predictor Size," Joint Collaborative Team on Video Coding (JCT-VC) of ITU-T SG 16 WP 3 and ISO/IEC JTC 1/SC 29/WG 11, Document: JCTVC-U0097r2, 21st Meeting: Warsaw, PL, Jun. 19-26, 2015, pp. 1-4, XP-30117529A.
(Continued)

*Primary Examiner* — Nguyen T Truong
(74) *Attorney, Agent, or Firm* — Birch, Stewart, Kolasch & Birch, LLP

(57) ABSTRACT

A method of encoding or decoding coding units of a video content in a palette coding mode using an adaptive palette predictor is provided. The method includes adaptively determining a maximum size of the adaptive palette predictor based on at least one of a complexity of the video content and coding quality of the video content; and encoding or decoding the coding units of the video content in the palette coding mode using the adaptive palette predictor while limiting the adaptive palette predictor that is derived from all palette(s) of previously encoded or decoded coding unit(s)
(Continued)

of the video content within the maximum size determined in the adaptively determining step. An apparatus of encoding or decoding coding units of a video content in a palette coding mode using an adaptive palette predictor is also provided.

18 Claims, 23 Drawing Sheets

(51) Int. Cl.

| | | |
|---|---|---|
| H04N 19/96 | (2014.01) | |
| H04N 19/61 | (2014.01) | |
| H04N 19/186 | (2014.01) | |
| H04N 19/124 | (2014.01) | |
| H04N 19/154 | (2014.01) | |
| H04N 19/176 | (2014.01) | |
| H04N 19/182 | (2014.01) | |
| H04N 19/46 | (2014.01) | |
| H04N 19/134 | (2014.01) | |
| H04N 19/102 | (2014.01) | |
| H04N 19/593 | (2014.01) | |

(52) U.S. Cl.
CPC ........... *H04N 19/134* (2014.11); *H04N 19/15* (2014.11); *H04N 19/154* (2014.11); *H04N 19/176* (2014.11); *H04N 19/182* (2014.11); *H04N 19/186* (2014.11); *H04N 19/46* (2014.11); *H04N 19/593* (2014.11); *H04N 19/61* (2014.11); *H04N 19/96* (2014.11)

(58) Field of Classification Search
USPC .................................................. 375/240.03
See application file for complete search history.

(56) References Cited

U.S. PATENT DOCUMENTS

| | | |
|---|---|---|
| 2015/0016501 A1 | 1/2015 | Guo et al. |
| 2015/0110181 A1 | 4/2015 | Saxena et al. |
| 2015/0281728 A1 | 10/2015 | Karczewicz et al. |
| 2016/0100171 A1 | 4/2016 | Karczewicz et al. |

FOREIGN PATENT DOCUMENTS

| | | |
|---|---|---|
| CN | 105491379 A | 4/2016 |
| TW | 201108747 A1 | 3/2011 |
| TW | 201519156 A | 5/2015 |
| TW | 201543870 A | 11/2015 |
| TW | 201603563 A | 1/2016 |
| TW | 201615012 A | 4/2016 |

OTHER PUBLICATIONS

Extended European Search Report, dated Nov. 3, 2016, for European Application No. 16173459.5.

Gisquet, "SCCE3: Crosscheck of JCTVC-R0166 on Test A.5," Joint Collaborative Team on Video Coding (JCT-VC) of ITU-T SG 16 WP 3 and ISO/IEC JTC 1/SC 29/WG 11, Document: JCTVC-R0092, 18th Meeting: Sapporo, JP, Jun. 30-Jul. 9, 2014 (Jun. 27, 2014), pp. 1-10, XP-30116346A.

Joshi et al., "Description of Screen Content Core Experiment 5 (SCCE5) . . . ," Joint Collaborative Team on Video Coding (JCT-VC) of ITU-T SG 16 WP 3 and ISO/IEC JTC 1/SC 29/WG 11, Document: JCTVC-R1105-rl, 18th Meeting: Sapporo, JP, Jun. 30-Jul. 9, 2014, pp. 1-3, XP-30116712A.

Joshi et al., "Screen Content Coding Test Model 4 (SCM 4)," Joint Collaborative Team on Video Coding (JCT-VC) of ITU-T SG 16 WP 3 and ISO/IEC JTC 1/SC 29/WG 11, Document: JCTVC-T1014, 20th Meeting: Geneva, CH, Feb. 10-18, 2015, pp. 1-12, XP-30117420A.

Wang et al., "Non-CE5: CU Dependent Color Palette Maximum Size," Joint Collaborative Team on Video Coding (JCT-VC) of ITU-T SG 16 WP 3 and ISO/IEC JTC 1/SC 29/WG 11, Document: JCTVC-S0201, 19th Meeting, Strasbourg, FR, Oct. 17-24, 2014 (Oct. 9, 2014), pp. 1-3.

Xiu et al., "Palette-based Coding in the Screen Content Coding Extension of the HEVC Standard," 2015 Data Compression Conference, IEEE, 2015 (Apr. 1, 2015), pp. 253-262, XP-55281837A.

Xu et al., "2-D Index Map Coding for HEVC Screen Content Compression," 2015 Data Compression Conference, IEEE, 2015 (Apr. 7, 2015), pp. 263-272, XP-32963974A.

Buttigieg et al., "Using Variable-Length Error-Correcting Codes in MPEG-4 Video", Proceedings of the International Symposium on Information Theory. pp. 1-5, 2005.

Guo et al., "Color Palette for Screen Content Coding", IEEE International Conference on Image Conference, pp. 5556-5560, 2014.

Joshi et al., "Screen Content Coding Test Model 1 (SCM 1)", JCTVC-Q1014. pp. 1-5, 2014.

Pan et al., "A Low Complexity Screen Compression Scheme for Interactive Screen Sharing", IEEE Transactions on Circuits and Systems for Video Technology, vol. 23, No. 6, pp. 949-960, 2013.

Pu et al., "AHG10: Suggested Software for Palette Coding Based on RExt6.0", JCTVC-Q0094, pp. 1-4, 2014.

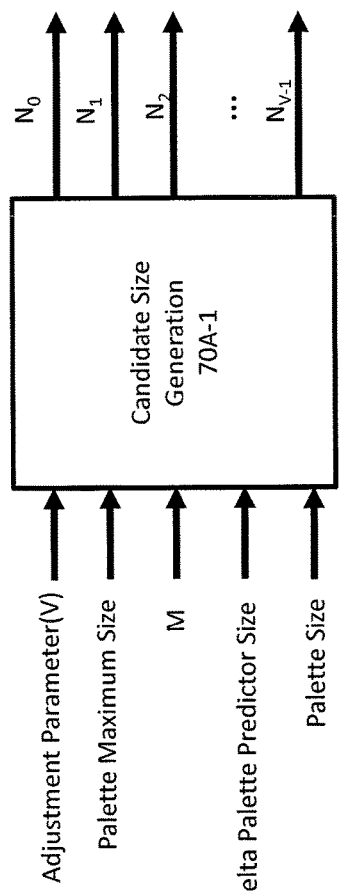

Palette Predictor Candidate Size(s) = $N_i$, i=0, 1, 2,..., V-1
Palette Maximum Size $\leq N_i \leq$ B
B = M* Palette Maximum Size
$N_i = g(p,d,i,v) = p + d \times \left(i - \left\lceil \frac{v}{2} \right\rceil + 1\right)$
p = Palette Size + Delta Palette Predictor Size
$d = \left\lceil \frac{\min(B - Delta\ Palette\ Predictor\ Size, Delta\ Palette\ Predictor\ Size)}{V} \right\rceil$ $1 \leq V \leq$ Maximum qp, $V \in$ positive integer
$1 \leq M \leq \log_2$(Transform Unit (TU) Maximum Size)

FIG. 7A-1

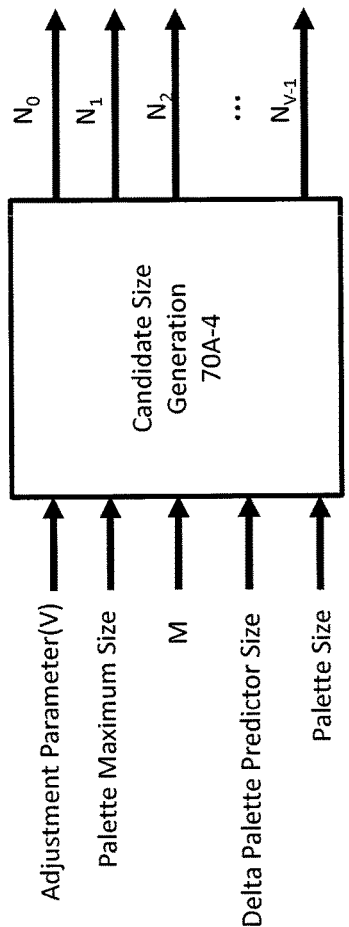

FIG. 7A-4

Palette Predictor Candidate Size(s) = $N_i$, i=0, 1, 2,..., V-1

Palette Maximum Size ≤ $N_i$ ≤ B

B = M* Palette Maximum Size $N_i = g(p,d,i,v) = p + d \times \left(i - \left\lceil \frac{V}{2} \right\rceil + 1\right)$ p = Palette Size + Delta Palette Predictor Size $d = \left\lceil \dfrac{\left\lceil \text{Delta Palette Predictor Size} \right\rceil}{V} \right\rceil$ 1 ≤ V ≤ Maximum qp, V ∈ positive integer 1 ≤ M ≤ $\log_2$(Transform Unit (TU) Maximum Size)

Palette Predictor Candidate Size(s) = $N_i$, i=0, 1, 2,..., V-1

Palette Maximum Size ≤ $N_i$ ≤ B

B = M* Palette Maximum Size $N_i$ = p = Palette Size + Delta Palette Predictor Size (fixed output)

1 ≤ V ≤ Maximum qp, V ∈ positive integer

1 ≤ M ≤ $\log_2$(Transform Unit (TU) Maximum Size)

Palette Predictor Candidate Size(s) = $N_i$, i=0, 1, 2,..., V-1

Palette Maximum Size ≤ $N_i$ ≤ B

B = M * Palette Maximum Size $N_i = g(i,v,m) = \left\lfloor \dfrac{\lfloor (M-1) \times \text{Palette Maximum Size} \rfloor \times (i+1)}{V} \right\rfloor + \text{Palette Maximum Size}$ 1 ≤ V ≤ Maximum qp, V ∈ positive integer 1 ≤ M ≤ $\log_2$(Transform Unit (TU) Maximum Size)

Palette Predictor Candidate Size(s) = $N_i$, i=0, 1, 2,..., V-1

Palette Maximum Size ≤ $N_i$ ≤ B

B = M* Palette Maximum Size $N_i$: Determined by Lookup Table (fixed output)

| | Palette Predictor Maximum Size |
|---|---|
| $N_3$ | 128 |
| $N_2$ | 96 |
| $N_1$ | 86 |
| $N_0$ | 64 |

Lookup Table for V = 4

1 ≤ V ≤ Maximum qp, V ∈ positive integer

1 ≤ M ≤ $\log_2$(Transform Unit (TU) Maximum Size)

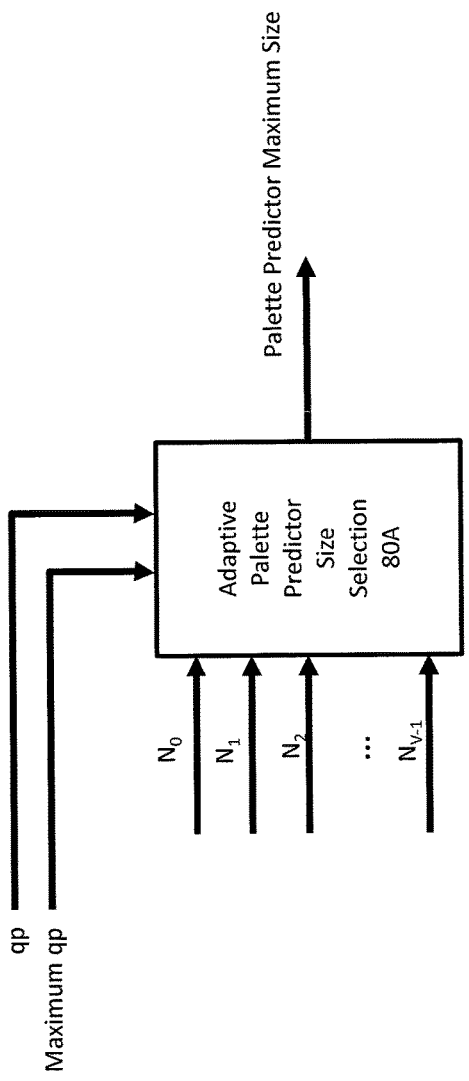

Palette Predictor Maximum Size = Ns $$r = \left\lfloor \frac{Maximum\ qp + 1}{V} \right\rfloor$$

$$s = \left\lfloor \frac{Maximum\ qp - qp}{r} \right\rfloor$$

qp: the qp in the configuration files generating level, the configuration files parsing level, the syntax (parameter set) generating level, the syntax (parameter set) parsing level, the frame level, the slice level or the coding unit level

FIG. 8A

Palette Predictor Maximum Size: Determined by Lookup Table

| CU size | Palette Predictor Maximum Size |
|---|---|
| 64 | $N_3$ (127) |
| 32 | $N_2$ (64) |
| 16 | $N_1$ (32) |
| 8 | $N_0$ (16) |

Lookup Table mapping between CU size and Ni

METHOD AND APPARATUS OF ENCODING OR DECODING CODING UNITS OF A VIDEO CONTENT IN A PALETTE CODING MODE USING AN ADAPTIVE PALETTE PREDICTOR

CROSS-REFERENCE TO RELATED APPLICATIONS

This nonprovisional application claims priority under 35 U.S.C. § 119(e) on, and claims the benefit of, U.S. Provisional Application No. 62/172,256, filed on Jun. 8, 2015, the entirety of which is incorporated herein by reference.

TECHNICAL FIELD

The present invention relates to a method and apparatus of encoding or decoding coding units of a video content in a palette coding mode using an adaptive palette predictor with an adaptive maximum size.

BACKGROUND

Technologies for coding non-camera-captured content videos or screen content videos have received great interests lately due to the rapid growth of application areas such as wireless displays, remote computer desktop access, real-time screen sharing for videoconferencing, cloud gaming, etc. Compared to camera-captured content videos, which contain rich colors and complex patterns, screen content videos contain a significant portion of computer-rendered graphics and text with fewer number of colors and the repetition of textual patterns.

For example, in a screen content image with text, a coding block typically contains only the foreground text color and the background color. Sometimes, the random patterns of text characters and letters make it challenging for the current coding block to find a matching block in the same or previously coded pictures. It may also be challenging to utilize the directional local intra prediction for efficient compression in this circumstance. Since traditional intra and inter video coding tools were designed primarily for camera-captured content videos, and screen content videos have significantly different characterizes from camera-captured content videos, these traditional intra and inter video coding tools are less sufficient for screen content videos. Therefore, it creates an urgent need for efficient coding of screen content videos.

In response to the market demands, the ITU-T Video Coding Expert Group and ISO/IEC Motion Picture Expert Group have jointly launched a new standardization project, i.e., the High Efficiency Video Coding (HEVC) extensions on screen content coding (SCC). Several new video coding tools, including palette coding, have been developed and adopted into HEVC SCC draft standard to efficiently encode/decode screen content videos.

Palette coding is a major color-based prediction method. Different from traditionally intra and inter prediction that mainly removes redundancy between different coding units, palette coding targets at the redundancy of repetitive pixel values/patterns within the coding unit. In order to reduce the overhead of transmitting the original value of the major colors, a palette prediction was introduced in palette coding. In the current palette coding mode, all pixels of a coding block are analyzed and classified into a list of major colors, except for some rarely used pixels that cannot be classified to any of the major colors, which are classified into escape colors. Each major color is a representative color which has high frequency of occurrence in the coding block. For each palette coded coding unit (CU), a color index table, i.e., a palette, is formed with each index entry associated with one major color. All the pixels in the CU are converted into corresponding indices, except the escape pixels with the escape colors. FIG. 1 illustrates a simplified version of the palette coding process.

Then, the encoder starts a checking process to check if each of the index entries representing the major colors in the current CU matches any of the major colors in the current palette predictor. For each entry in the palette predictor, a flag (1: used; 0: not used) is sent to signal whether or not this entry is used in the current palette. If yes, this entry will be put in front of the current palette. Therefore, the flags corresponding to the entries of the current palette predictor are sent to signal which one(s) of the major colors in the current palette predictor is used in the current CU. For those entries in the current palette but not in the palette predictor, the number of them and their pixel (e.g., Y/Cb/Cr or R/G/B) values are signaled, and these signaled new entries are put at the bottom of the current palette. An example of the palette coding mode at the encoder side is illustrated in FIG. 2. The current palette size is then calculated as the number of reused palette entries plus the number of signaled new palette entries.

At the decoder side, the decoder receives the flags indicating which one(s) of the major colors in the current palette predictor is used in the current CU. The decoder checks the current palette predictor in order with the flags to determine which one(s) of the major colors in the current palette predictor is used in the current CU. The decoder also receives their pixel (e.g., Y/Cb/Cr or R/G/B) values of the new palette entries not in the current palette predictor. The decoder then generates a received palette for the CU with index entries corresponding to the used major colors (with the flag (1)) in the current palette predictor in front of the received palette, followed by the index entries corresponding to new major colors not in the current palette predictor. An example of the palette coding mode at the decoder side is illustrated in FIG. 3.

After palette coding the current CU or decoding the current palette-coded CU, the palette predictor is updated for the next CU or palette-coded CU. This is done using the information of the current palette. The entries (including the new entries) of the current/received palette are put in front of the new palette predictor, followed by those unused entries from the previous palette predictor. The new palette predictor size is then calculated as the size of the current palette plus the number of unused palette entries. An example of the update of the palette predictor is illustrated in FIG. 4.

However, in the current design, the maximum size of the palette predictor can be assigned as an arbitrary positive number. The lack of the limitation of the palette predictor maximum size raises problems in implementation and the update process of the palette predictor, because the decoder may need to prepare a buffer with an unlimited size for hardware implementation of the palette prediction, which is infeasible under the current technology. In addition, the current palette coding mode only allows one fixed maximum size of the palette predictor signaled at the SPS level regardless of the complexity of the video or the coding quality. The fixed palette predictor maximum size makes the palette coding inefficient and ineffective, because it may not fit the need for all different coding conditions and coding quality requirements.

SUMMARY

Accordingly, it is an object of the present invention to provide an adaptive maximum size of the palette predictor according to the complexity of the video content and/or the coding quality of the video content to improve the coding efficiency in a palette coding mode.

According to a one embodiment of the present invention, a method of encoding or decoding coding units of a video content in a palette coding mode using an adaptive palette predictor is provided. The method comprises: adaptively determining a maximum size of the adaptive palette predictor based on at least one of a complexity of the video content and coding quality of the video content; and encoding or decoding the coding units of the video content in the palette coding mode using the adaptive palette predictor while limiting the adaptive palette predictor that is derived from all palette(s) of previously encoded or decoded coding unit(s) of the video content within the maximum size determined in the adaptively determining step.

Furthermore, according to another embodiment of the present invention, an apparatus for encoding or decoding coding units of a video content in a palette coding mode using an adaptive palette predictor is provided. The apparatus comprises: a memory device storing the adaptive palette predictor; an adaptive palette predictor size determination unit configured to adaptively determine a maximum size of the adaptive palette predictor based on at least one of a complexity of the video content and coding quality of the video content; and an encoder or decoder configured to encode or decode the coding units of the video content in the palette coding mode using the adaptive palette predictor stored in the memory device while limiting the adaptive palette predictor that is derived from all palette(s) of previously encoded or decoded coding unit(s) of the video content within the maximum size provided by the adaptive palette predictor size determination unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7A-1 through 7A-5, 7B and 7C-1 through 7C-2 illustrate several embodiments of the candidate size generation unit as shown in FIG. 6;

FIGS. 8A-8E illustrate several embodiments of the adaptive palette predictor size selection unit as shown in FIG. 6.

DETAILED DESCRIPTION OF THE ILLUSTRATED EMBODIMENTS

Figure 1:
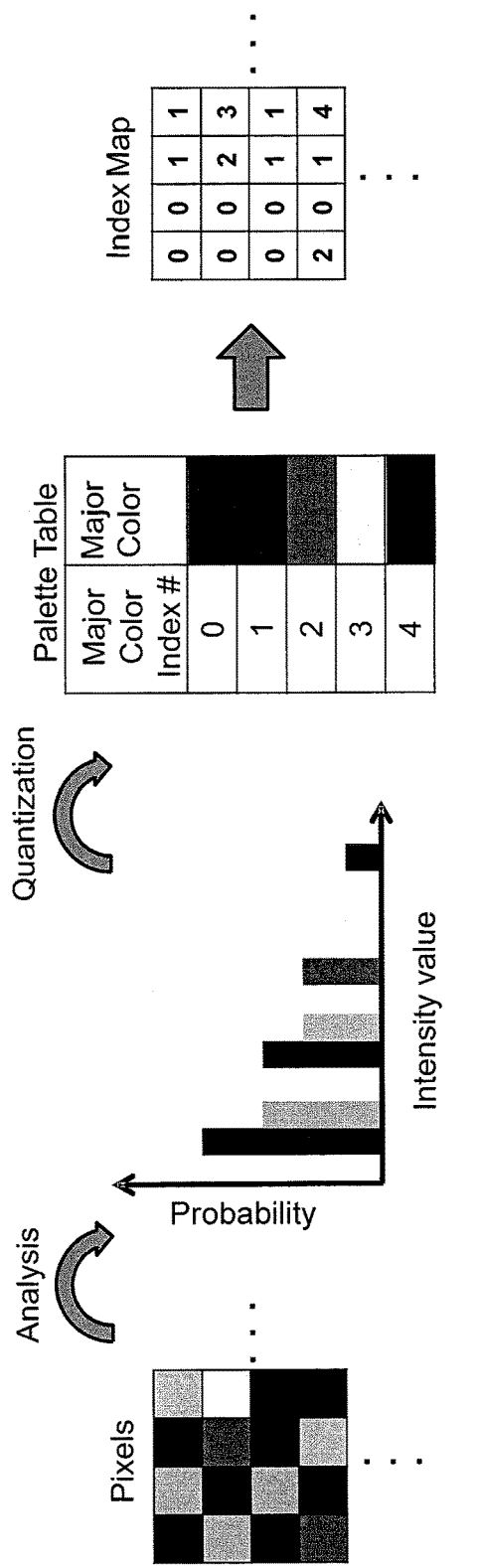
FIG. 1 illustrates a simplified version of the palette coding process.

The present invention will now be described in detail with reference to the accompanying drawings, wherein the same reference numerals will be used to identify the same or similar elements throughout the several views. It should be noted that the drawings should be viewed in the direction of orientation of the reference numerals.

As mentioned, a palette predictor with a fixed palette predictor maximum size may not fit the need for all different coding conditions and coding quality requirements in the palette coding mode. If the coding quality requirement is high, more major colors are expected to be generated with fine classification. Therefore, in order to have a good palette prediction, the maximum size of the palette predictor should be set higher to contain more major colors that have appeared in the previously decoded coding units. On the other hand, when coding quality requirement is low, less major colors are expected in the coding unit. Therefore, the maximum size of the palette predictor should be set lower to reduce the checking time of comparing index entries of the current palette with the palette predictor and reduce the chance to transmit the values of the unpredicted major colors, thereby improving the coding efficiency. In addition, with regard to the video content complexity, the major colors for the complex coding unit will increase and require a larger sized palette predictor to improve the hitting rate for coding efficiency. On the other hand, the simple video content or coding unit may not need so many major colors to represent. Therefore, the size of the palette predictors can be reduced to eliminate the extra checking times and to reduce the overhead of transmitting unused flags for the palette predictor. Therefore, instead of only having one fixed maximum size of the palette predictor, the maximum size of the palette predictor should be adaptively changed according to the complexity of the video content and the coding quality to enhance the coding efficiency in the palette coding mode.

Figure 5:
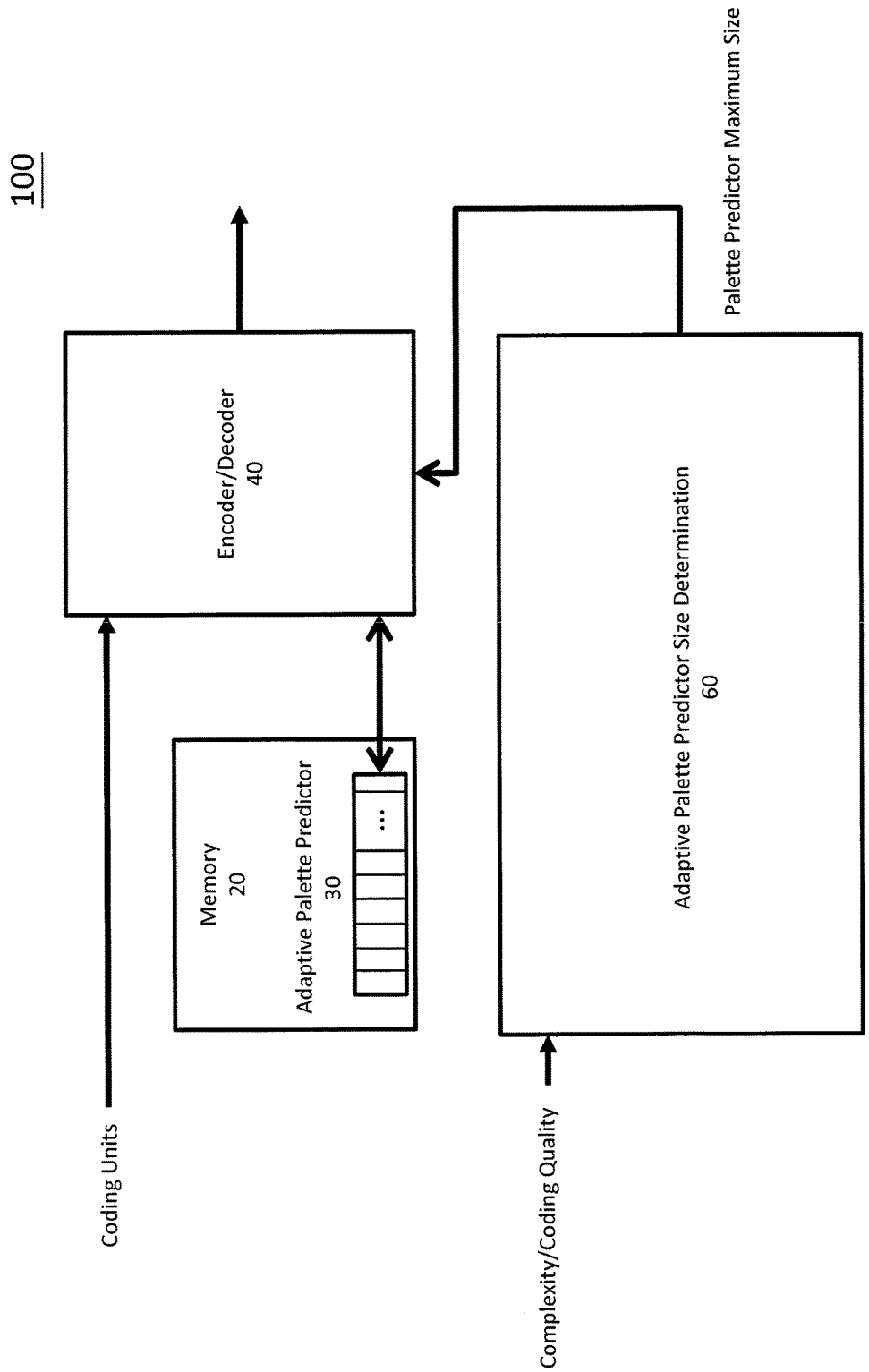
FIG. 5 is a block diagram of an apparatus for encoding or decoding coding units of a video content in a palette coding mode using an adaptive palette predictor in accordance with an embodiment of the present invention.

FIG. 5 is a block diagram of an apparatus for encoding or decoding coding units of a video content in a palette coding mode using an adaptive palette predictor in accordance with an embodiment of the present invention. As illustrated in FIG. 5, the apparatus 100 comprises a memory device 20 storing the adaptive palette predictor 30; an adaptive palette predictor size determination unit 60 configured to adaptively determine a maximum size of the adaptive palette predictor 30 based on at least one of a complexity of the video content and coding quality of the video content; and an encoder or decoder 40 configured to encode or decode the coding units of the video content in the palette coding mode using the adaptive palette predictor 30 stored in the memory device 20 while limiting the adaptive palette predictor that is derived from all palette(s) of previously encoded or decoded coding unit(s) of the video content within the maximum size provided by the adaptive palette predictor size determination unit 60. In an embodiment, the apparatus can be implemented by a processor with firmware/software, logic circuits, and/or hardware encoder/decoder, etc.

Figure 6:
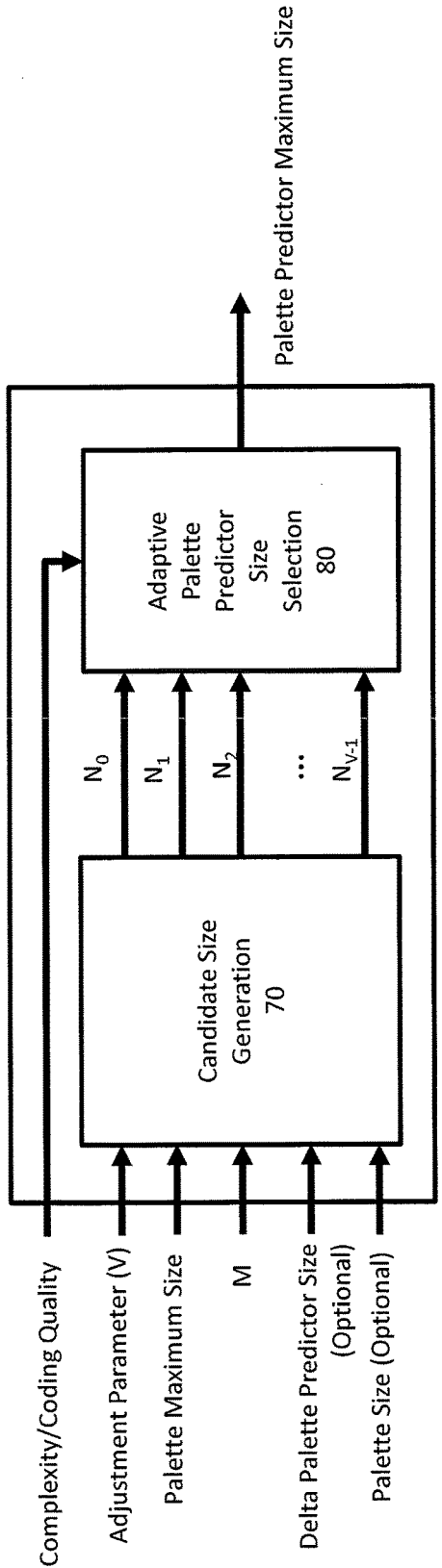
FIG. 6 is a block diagram of an adaptive palette predictor size determination unit in accordance with an embodiment of the present invention.

FIG. 6 is a block diagram of the adaptive palette predictor size determination unit 60 in accordance with an embodiment of the present invention. As shown in FIG. 6, the adaptive palette predictor size determination unit 60 receives the following parameters including the adjustment parameter V, the palette maximum size (the palette size of the coding units is equal to or less than the palette maximum size), M, and parameter(s) representing the complexity of the video content and/or the coding quality of the video content. In some embodiments, the adaptive palette predictor size determination unit 60 may also the delta palette predictor size and/or the palette size of the coding units.

As shown in FIG. 6, the adaptive palette predictor size determination unit 60 includes: a candidate size generation unit 70 configured to generate a set of candidate size(s) Ni (i=0, 1, . . . , V−1) of the adaptive palette predictor 30 based on at least V, M, and the palette maximum size, wherein V is an integer and V≥1, M≥1, and Ni≥the palette maximum size and Ni is capped at an upper bound of the maximum size of the adaptive palette predictor if Ni is larger than the upper bound; and an adaptive palette predictor size selection unit 80 configured to adaptively select one candidate size from the set of candidate size(s) Ni of the adaptive palette predictor, based on the at least one of the complexity of the video content and the coding quality of the video content, as the maximum size of the adaptive palette predictor. In an embodiment, the upper bound of the maximum size of the adaptive palette predictor is set based on M and the palette maximum size. In an embodiment, when M is an integer, the upper bound is set to be M* the palette maximum size, and when M is not an integer, the upper bound is set to be one of the following: round (M* the palette maximum size), ceiling (M* the palette maximum size), floor (M* the palette maximum size), round (M)* the palette maximum size, ceiling (M)* the palette maximum size, and floor (M)* the palette maximum size.

FIGS. 7A-1 through 7A-5, 7B and 7C-1 through 7C-2 illustrate several embodiments of the candidate size generation unit 70 as shown in FIG. 6.

Figures 2, 7A:
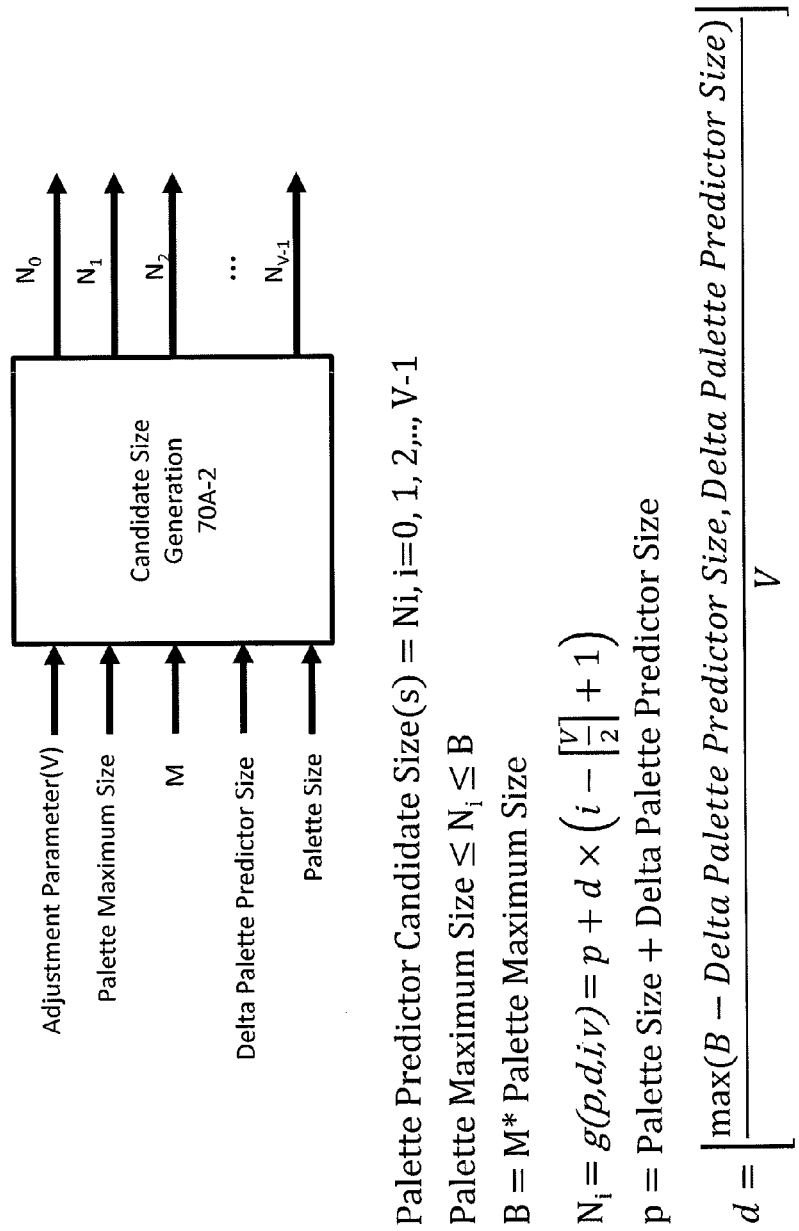
Figures 3, 7A:
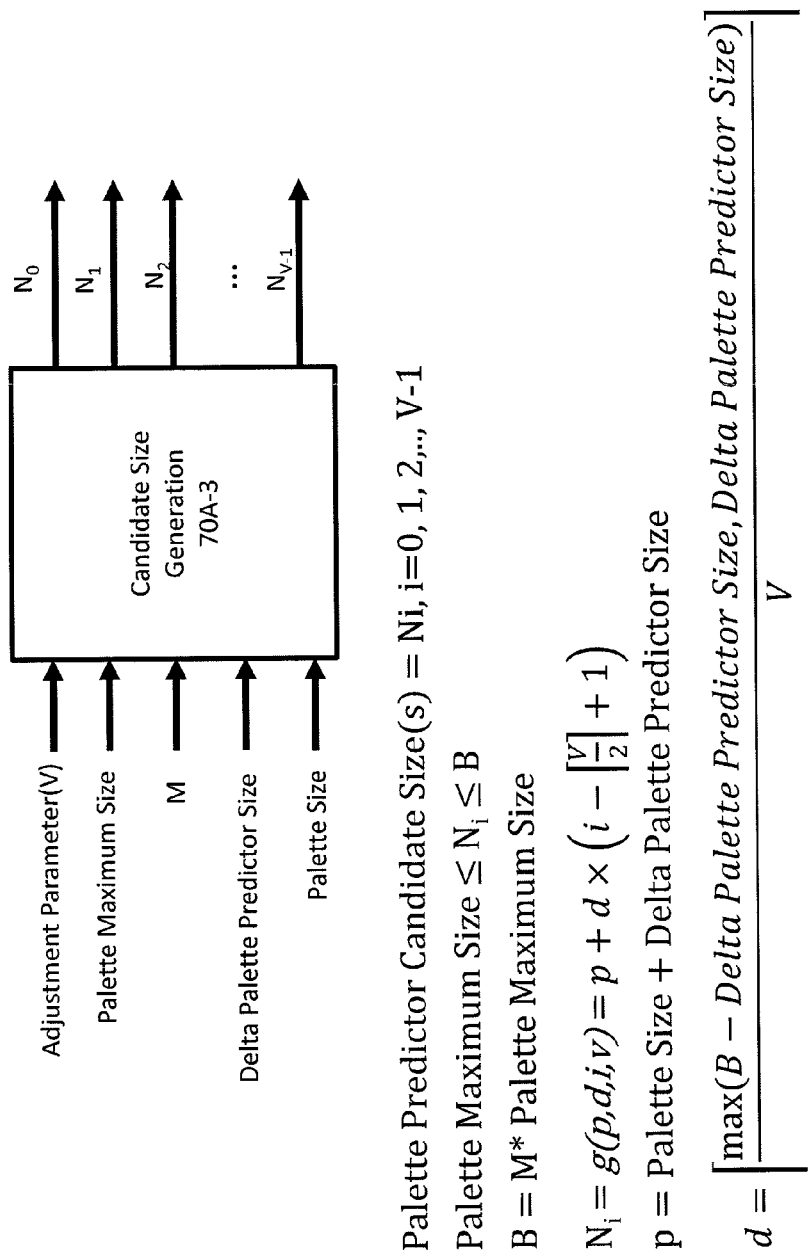
Figures 5, 7A:
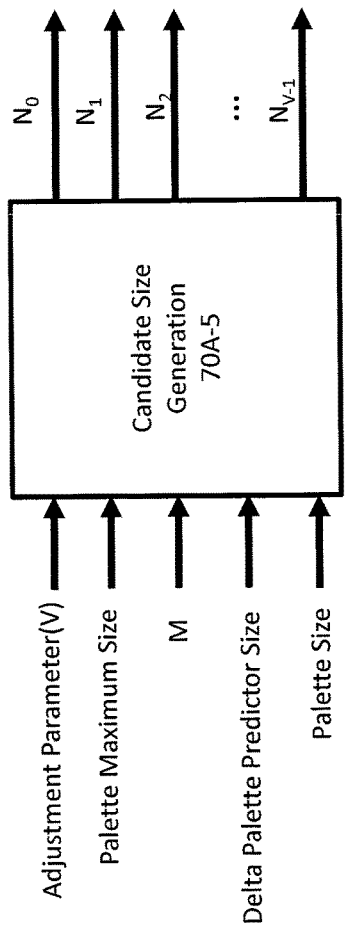

In the embodiments shown in FIG. 7A-1 through 7A-5, each of the candidate size generation units 70A-1, 70A-2, 70A-3, 70A-4, and 70A-5 is configured to generate the set of candidate size(s) of the adaptive palette predictor 30 further based on the delta palette predictor size and the palette size in addition to V, M, and the palette maximum size.

In the embodiment shown in FIG. 7A-1, the candidate size generation units 70A-1 generates a set of candidate size(s) Ni (i=0, 1, . . . , V−1) of the adaptive palette predictor 30 as follows:

$$N_i = g(p, d, i, V) = p + d \times \left(i - \left\lceil \frac{V}{2} \right\rceil + 1\right),$$

where
Palette Maximum Size≤$N_i$≤B,
B=M*Palette Maximum Size (i.e., the upper bound of the maximum size of the adaptive palette predictor, and M is an integer in this embodiment),
p=Palette Size+Delta Palette Predictor Size, $$d = \left\lfloor \frac{\min(B - \text{Delta Palette Predictor Size}, \text{Delta Palette Predictor Size})}{V} \right\rfloor,$$

1≤V≤Maximum qp, and V is a positive integer, and
1≤M≤$\log_2$ (Transform Unit (TU) Maximum Size).

In the embodiment shown in FIG. 7A-2, the candidate size generation units 70A-2 generates a set of candidate size(s) Ni (i=0, 1, . . . , V−1) of the adaptive palette predictor 30 as follows:

$$N_i = g(p, d, i, V) = p + d \times \left(i - \left\lceil \frac{V}{2} \right\rceil + 1\right),$$

where
Palette Maximum Size≤$N_i$≤B,
B=M*Palette Maximum Size (i.e., the upper bound of the maximum size of the adaptive palette predictor, and M is an integer in this embodiment),
p=Palette Size+Delta Palette Predictor Size, $$d = \left\lfloor \frac{\min(B - \text{Delta Palette Predictor Size}, \text{Delta Palette Predictor Size})}{V} \right\rfloor,$$

1≤V≤Maximum qp, and V is a positive integer, and
1≤M≤$\log_2$ (Transform Unit (TU) Maximum Size).

Figure 3:
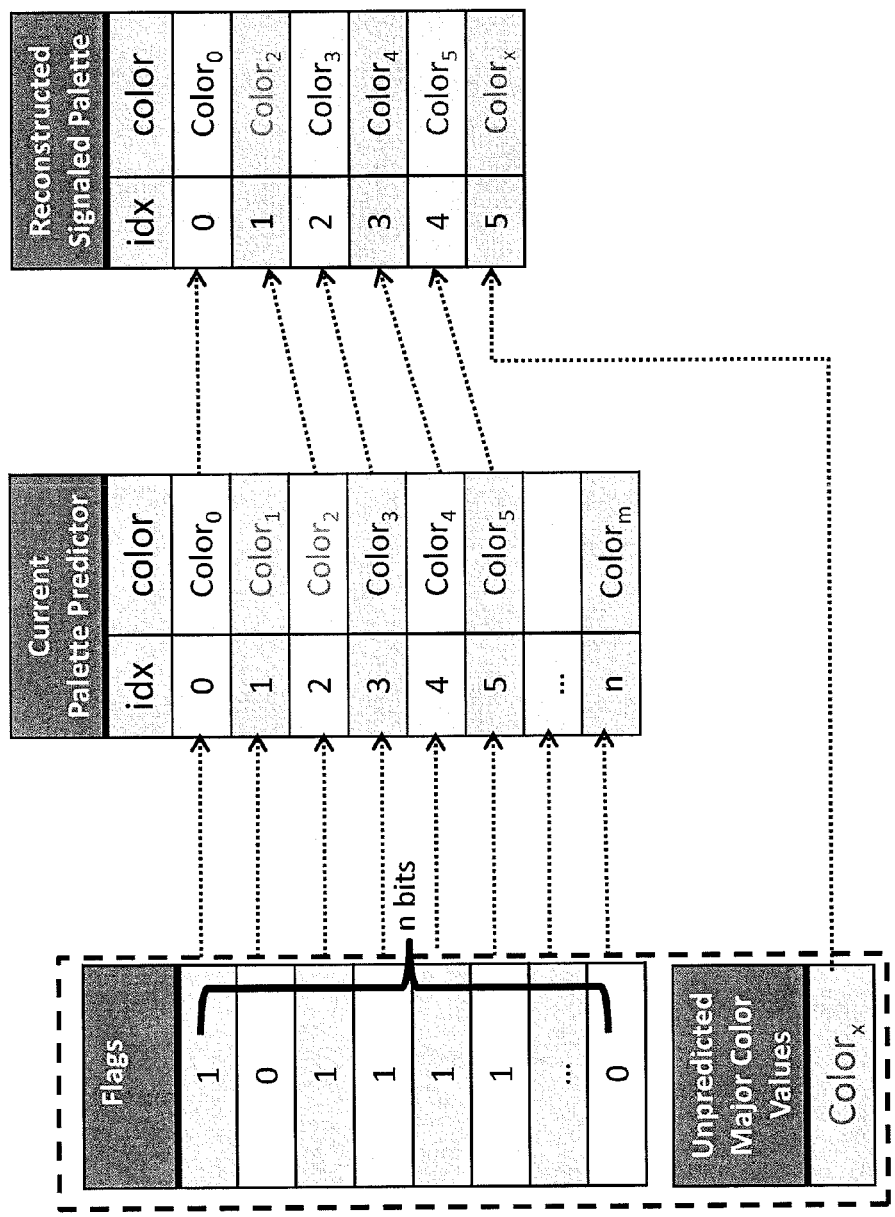
FIG. 3 illustrates an example of the palette coding mode at the decoder side.

In the embodiment shown in FIG. 7A-3, the candidate size generation units 70A-3 generates a set of candidate size(s) Ni (i=0, 1, . . . , V−1) of the adaptive palette predictor 30 as follows:

$$N_i = g(p, d, i, V) = p + d \times \left(i - \left\lceil \frac{V}{2} \right\rceil + 1\right),$$

where
Palette Maximum Size≤$N_i$≤B,
B=M*Palette Maximum Size (i.e., the upper bound of the maximum size of the adaptive palette predictor, and M is an integer in this embodiment),
p=Palette Size+Delta Palette Predictor Size, $$d = \left\lceil \frac{\min(B - \text{Delta Palette Predictor Size}, \text{Delta Palette Predictor Size})}{V} \right\rceil,$$

1≤V≤Maximum qp, and V is a positive integer, and
1≤M≤$\log_2$ (Transform Unit (TU) Maximum Size).

Figure 4:
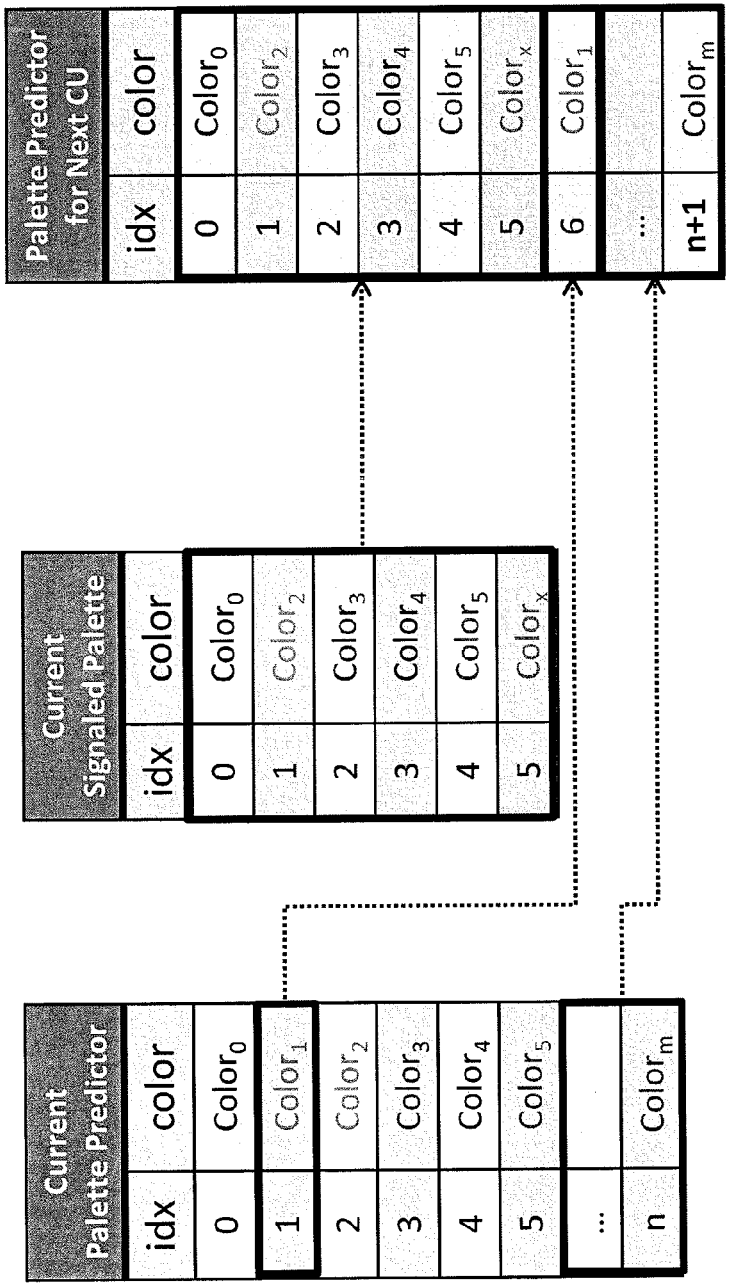
FIG. 4 illustrates an example of the update of the palette predictor.

In the embodiment shown in FIG. 7A-4, the candidate size generation units 70A-4 generates a set of candidate size(s) Ni (i=0, 1, . . . , V−1) of the adaptive palette predictor 30 as follows:

$$N_i = g(p, d, i, V) = p + d \times \left(i - \left\lceil \frac{V}{2} \right\rceil + 1\right),$$

where
Palette Maximum Size≤$N_i$≤B,

B=M*Palette Maximum Size (i.e., the upper bound of the maximum size of the adaptive palette predictor, and M is an integer in this embodiment), p=Palette Size+Delta Palette Predictor Size, $$d = \left\lceil \frac{\text{Delta Palette Predictor Size}}{V} \right\rceil,$$

$1 \le V \le$ Maximum qp, and V is a positive integer, and $1 \le M \le \log_2$ (Transform Unit (TU) Maximum Size).

In the embodiment shown in FIG. 7A-5, the candidate size generation units 70A-5 generates a set of candidate size(s) Ni (i=0, 1, . . . , V−1) of the adaptive palette predictor 30 as follows:

$N_i$=p=Palette Size+Delta Palette Predictor Size
where
Palette Maximum Size$\le N_i \le$B,
B=M*Palette Maximum Size (i.e., the upper bound of the maximum size of the adaptive palette predictor, and M is an integer in this embodiment),
$1 \le V \le$ Maximum qp, and V is a positive integer, and $1 \le M' \log_2$ (Transform Unit (TU) Maximum Size).

In other words, the set of candidate size(s) Ni is a fixed output for i=0, 1, . . . , V−1.

Figure 7B:
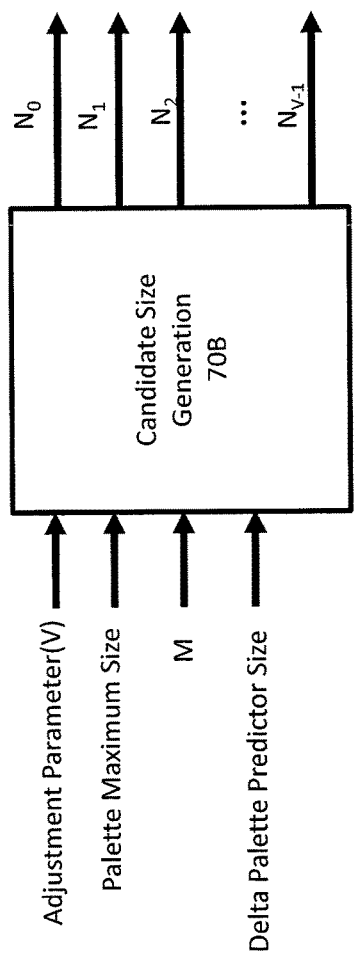

In the embodiment shown in FIG. 7B, the candidate size generation unit 70B is configured to generate the set of candidate size(s) of the adaptive palette predictor 30 further based on the delta palette predictor size in addition to V, M, and the palette maximum size without further based on the palette size.

In the embodiment shown in FIG. 7B, the candidate size generation units 70B generates a set of candidate size(s) Ni (i=0, 1, . . . , V−1) of the adaptive palette predictor 30 as follows:

$$N_i = g(i, V, M) = \left\lfloor \frac{(M-1) \times \text{Delta Palette Predictor Size}}{V} \right\rfloor \times (i-1) +$$

Palette Maximum Size, where
Palette Maximum Size$\le N_i \le$B,
B=M*Palette Maximum Size (i.e., the upper bound of the maximum size of the adaptive palette predictor, and M is an integer in this embodiment),
$1 \le V \le$ Maximum qp, and V is a positive integer, and $1 \le M \le \log_2$ (Transform Unit (TU) Maximum Size).

Figure 2:
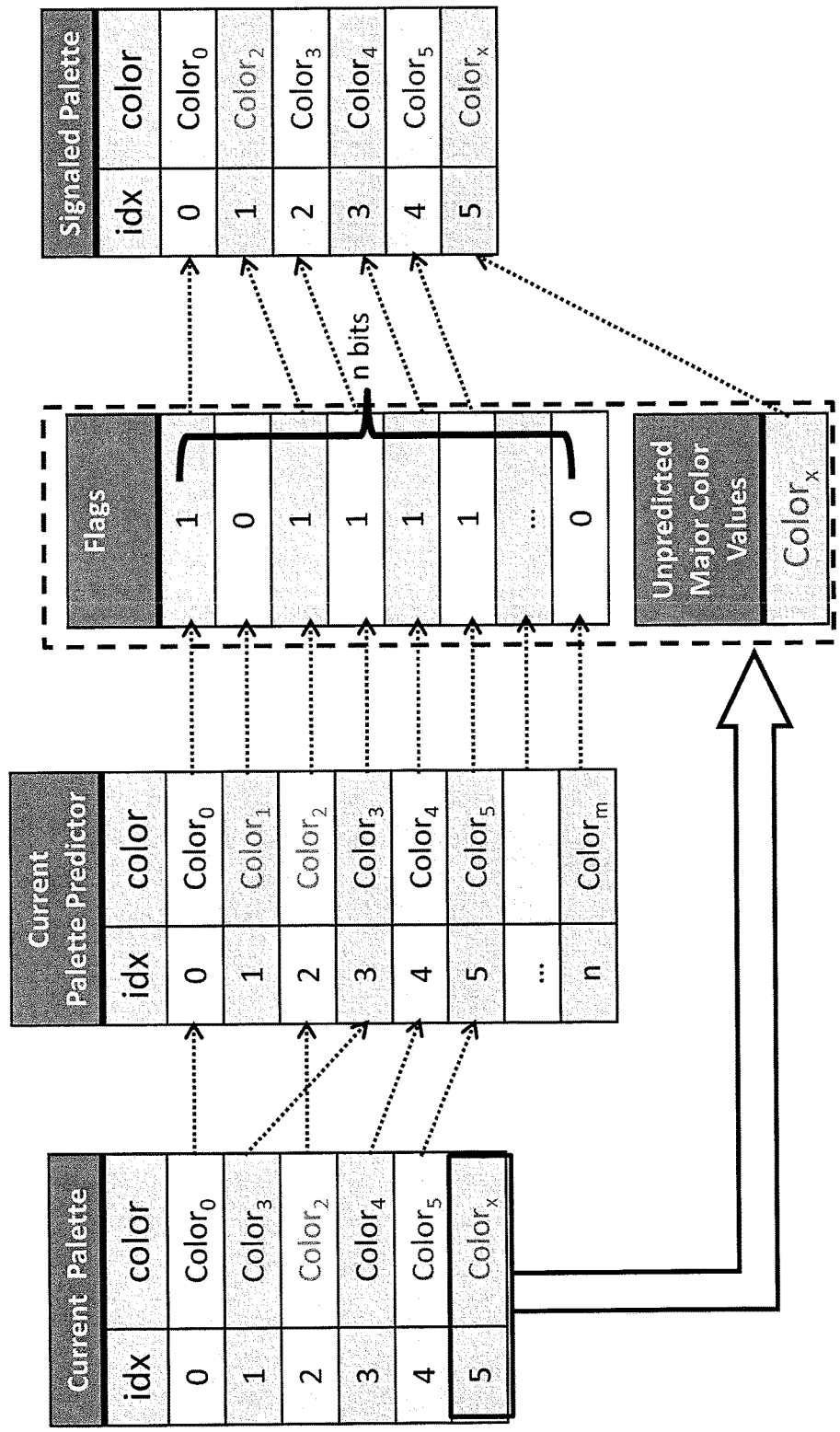
FIG. 2 illustrates an example of the palette coding mode at the encoder side.
Figures 1, 7C:
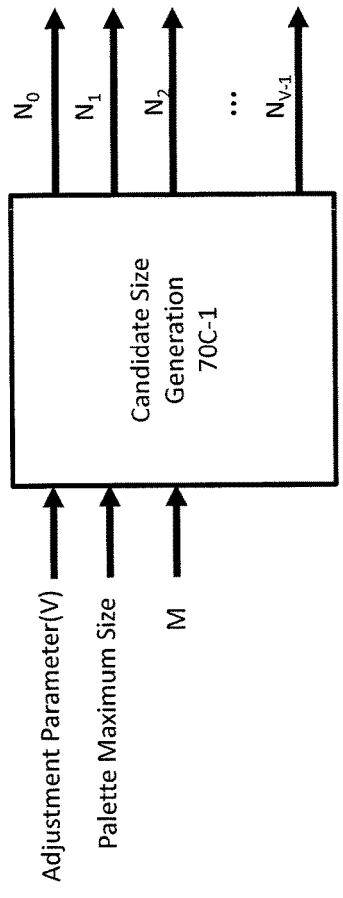
Figures 2, 7C:
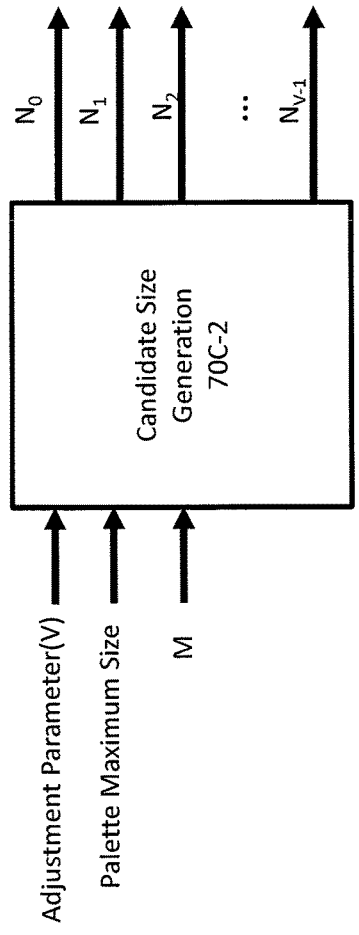

In the embodiments shown in FIGS. 7C-1 and 7C-2, each of the candidate size generation units 70C-1 and 70C-2 is configured to generate the set of candidate size(s) of the adaptive palette predictor 30 based on V, M, and the palette maximum size without further based on the delta palette predictor size or the palette size.

In the embodiment shown in FIG. 7C-1, the candidate size generation units 70C-1 generates a set of candidate size(s) Ni (i=0, 1, . . . , V−1) of the adaptive palette predictor 30 as follows:

$$N_i = g(i, V, M) =$$

$$\left\lfloor \frac{(M-1) \times \text{Palette Maximum Size}}{V} \right\rfloor \times (i+1) + \text{Palette Maximum Size},$$

where
Palette Maximum Size$\le N_i \le$B,
B=M*Palette Maximum Size (i.e., the upper bound of the maximum size of the adaptive palette predictor, and M is an integer in this embodiment),
$1 \le V \le$ Maximum qp, and V is a positive integer, and $1 \le M \le \log_2$ (Transform Unit (TU) Maximum Size).

In the embodiment shown in FIG. 7C-2, the candidate size generation units 70C-2 generates a set of candidate size(s) Ni (i=0, 1, . . . , V−1) of the adaptive palette predictor 30 as follows:

$N_i$ is determined based on a lookup table.
where
Palette Maximum Size$\le N_i \le$B (i.e., the upper bound of the maximum size of the adaptive palette predictor, and M is an integer in this embodiment),
B=M*Palette Maximum Size,
$1 \le V \le$ Maximum qp, and V is a positive integer, and $1 \le M \le \log_2$ (Transform Unit (TU) Maximum Size).

Below is an example of the lookup table for V=4

|  | Palette Predictor Maximum Size |
|---|---|
| $N_3$ | 128 |
| $N_2$ | 96 |
| $N_1$ | 86 |
| $N_0$ | 64 |

FIGS. 8A-8E illustrate several embodiments of the adaptive palette predictor size selection unit 80 as shown in FIG. 6.

Figure 8B:
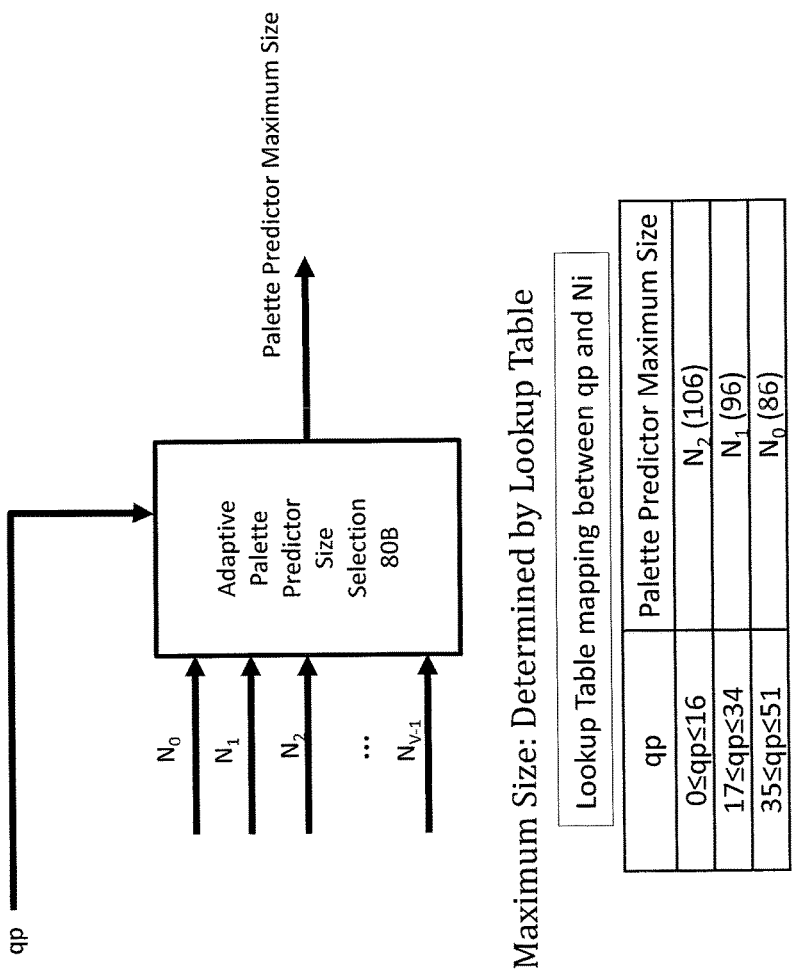

In the embodiments shown in FIGS. 8A and 8B, each of the adaptive palette predictor size selection units 80A and 80B is configured to adaptively select one candidate size from the set of candidate size(s) Ni of the adaptive palette predictor 30, based on the coding quality of the video content, as the maximum size of the adaptive palette predictor 30.

In an embodiment, the coding quality is determined based on at least one of a current quantization parameter of and a maximum quantization parameter of a coding unit level, a slice level, a frame level, a syntax (parameter set) parsing level (e.g. SPS/PPS/VPS/SEI parsing level), a syntax (parameter set) generating level (e.g. SPS/PPS/VPS/SEI generating level), a configuration files parsing level, or a configuration files generating level of the video content, and V$\le$the maximum quantization parameter (qp).

For example, in the embodiment shown in FIG. 8A, the adaptive palette predictor size selection units 80A adaptively selects one candidate size from the set of candidate size(s) Ni of the adaptive palette predictor 30 as follows:

Palette Predictor Maximum Size=Ns,
where
qp: the qp in the configuration files generating level (in the encoder), the configuration files parsing level (in the encoder), the syntax (parameter set) generating level (in the encoder), the syntax (parameter set) parsing level (in the decoder), the frame level, the slice level or the coding unit level, $$r = \left\lceil \frac{\text{Maximum } qp + 1}{V} \right\rceil,$$

$$s = \left\lfloor \frac{\text{Maximum } qp - qp}{r} \right\rfloor,$$

and
$1 \leq V \leq$ Maximum qp, and V is a positive integer.

In an embodiment, the coding quality is the current quantization parameter (qp) of the coding unit level, the slice level, the frame level, the syntax (parameter set) parsing level (e.g. SPS/PPS/VPS/SEI parsing level), the syntax (parameter set) generating level (e.g. SPS/PPS/VPS/SEI parameter set generating level), the configuration files parsing level, or the configuration files generating level of the video content, and the adaptive palette predictor size selection unit is configured to adaptively select the one candidate size from the set of candidate size(s) Ni of the adaptive palette predictor by selecting from a look-up table a size corresponding to the current quantization parameter of the coding unit level, the slice level, the frame level, the syntax (parameter set) parsing level, the syntax (parameter set) generating level, the configuration files parsing level, or the configuration files generating level of the video content.

For example, in the embodiment shown in FIG. 8B, the adaptive palette predictor size selection units 80B adaptively selects one candidate size from the set of candidate size(s) Ni of the adaptive palette predictor 30 as follows:

qp: the qp in the configuration files generating level (in the encoder), the configuration files parsing level (in the encoder), the syntax (parameter set) generating level (in the encoder), the syntax (parameter set) parsing level (in the decoder), the frame level, the slice level or the coding unit level Palette Predictor Maximum Size: Determined by Lookup Table mapping between qp and the candidate size(s) Ni.

Below is an example of the lookup table for V=3 with a mapping between different ranges of qp and the candidate sizes $N_0$-$N_2$.

| qp | Palette Predictor Maximum Size |
|---|---|
| $0 \leq qp \leq 16$ | $N_2$ (106) |
| $17 \leq qp \leq 34$ | $N_1$ (96) |
| $35 \leq qp \leq 51$ | $N_0$ (86) |

Figure 8C:
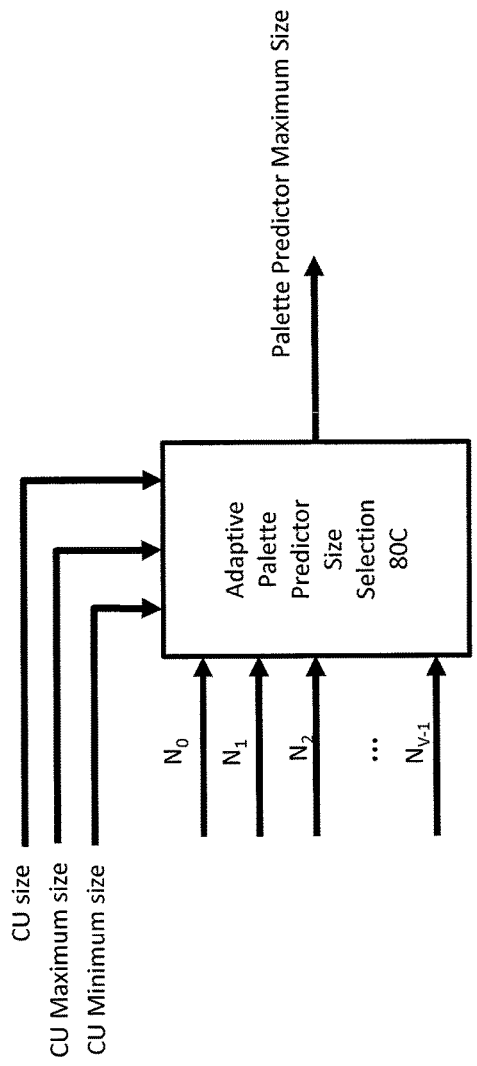
Figure 8D:
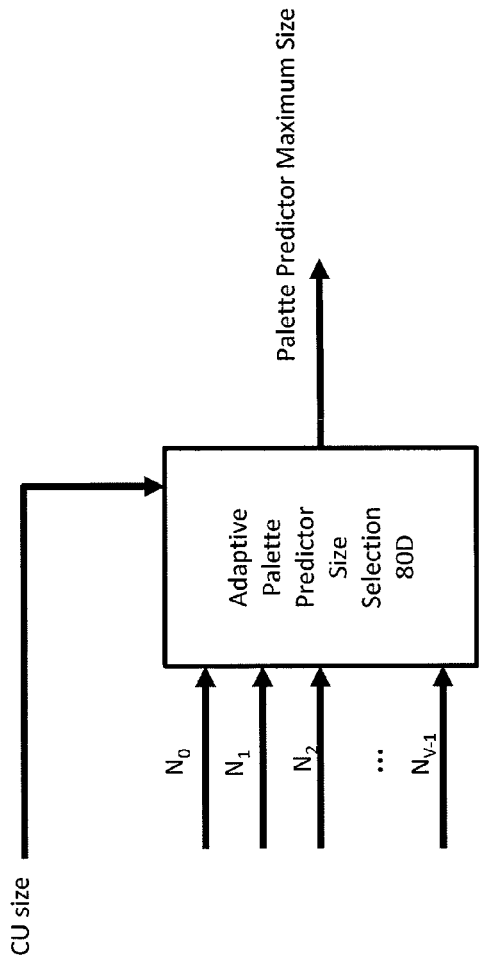
Figure 8E:
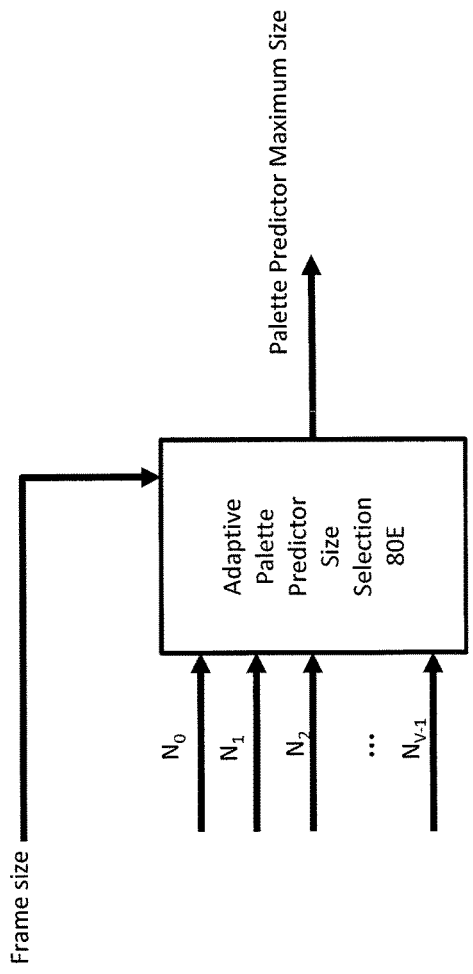
Figure 9A:
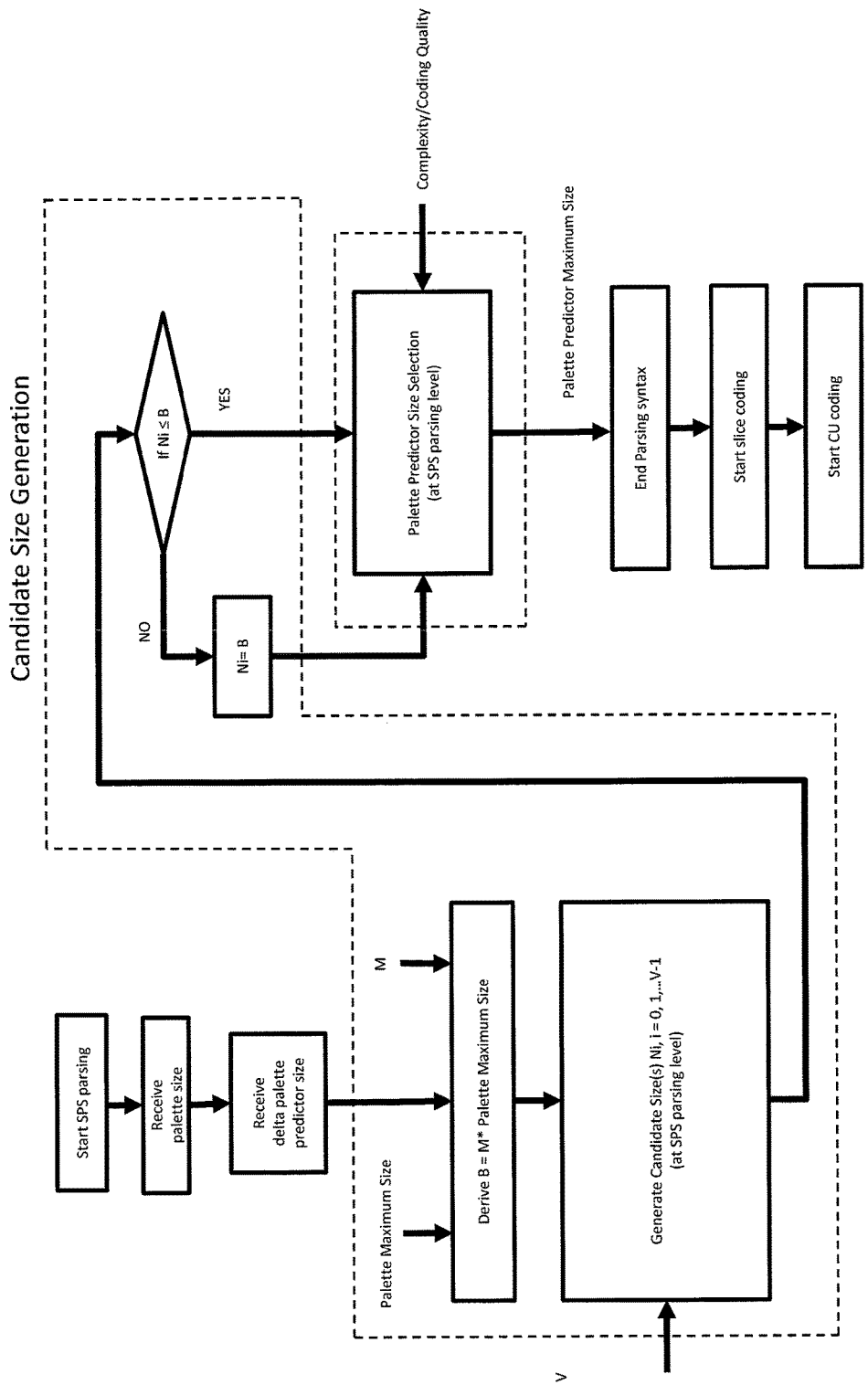
FIGS. 9A-9D illustrate some possible arrangements of the candidate size generation process and the adaptive palette predictor size selection process in the palette coding mode in accordance with embodiments of the present invention.
Figure 9B:
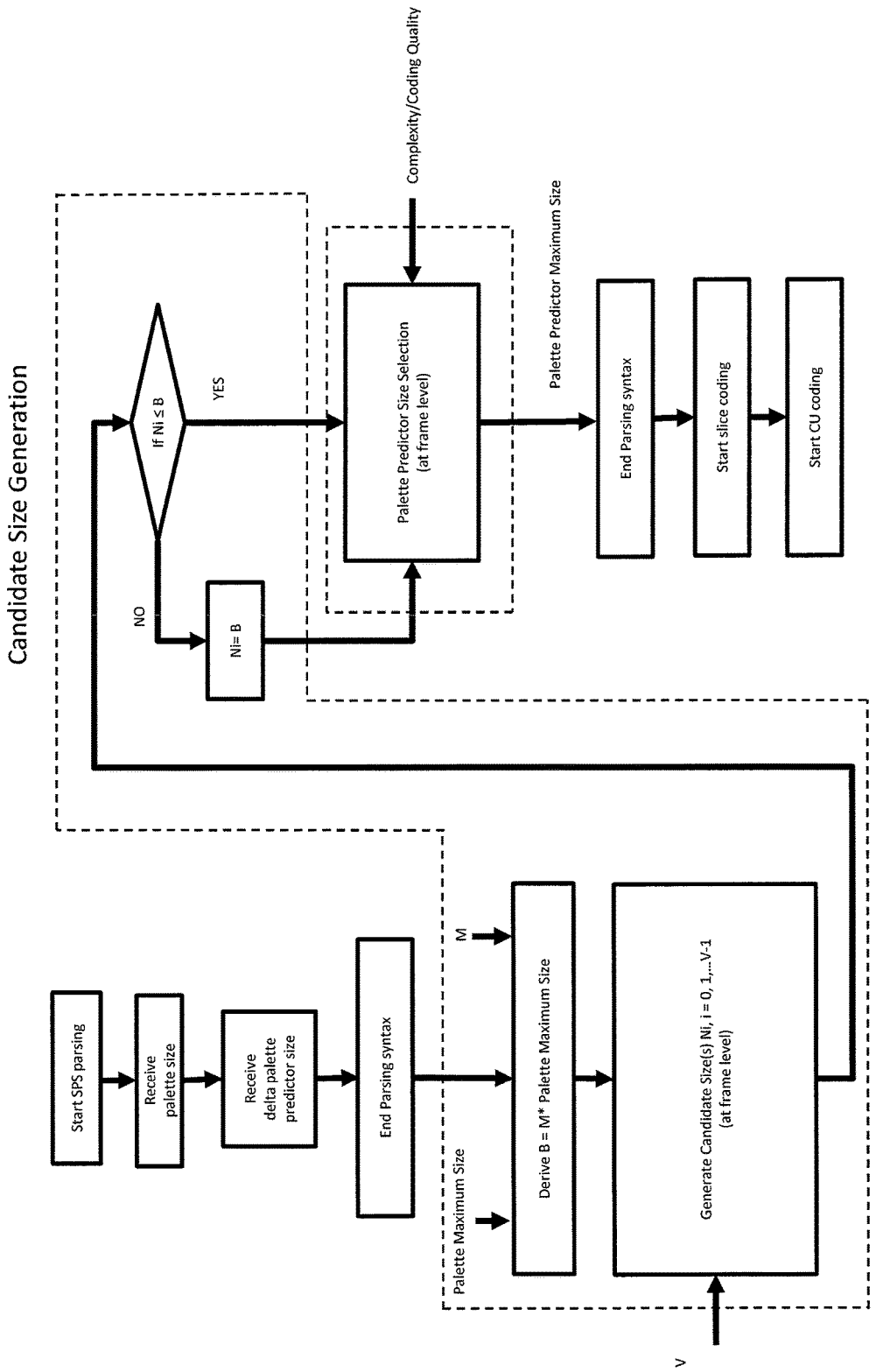
Figure 9C:
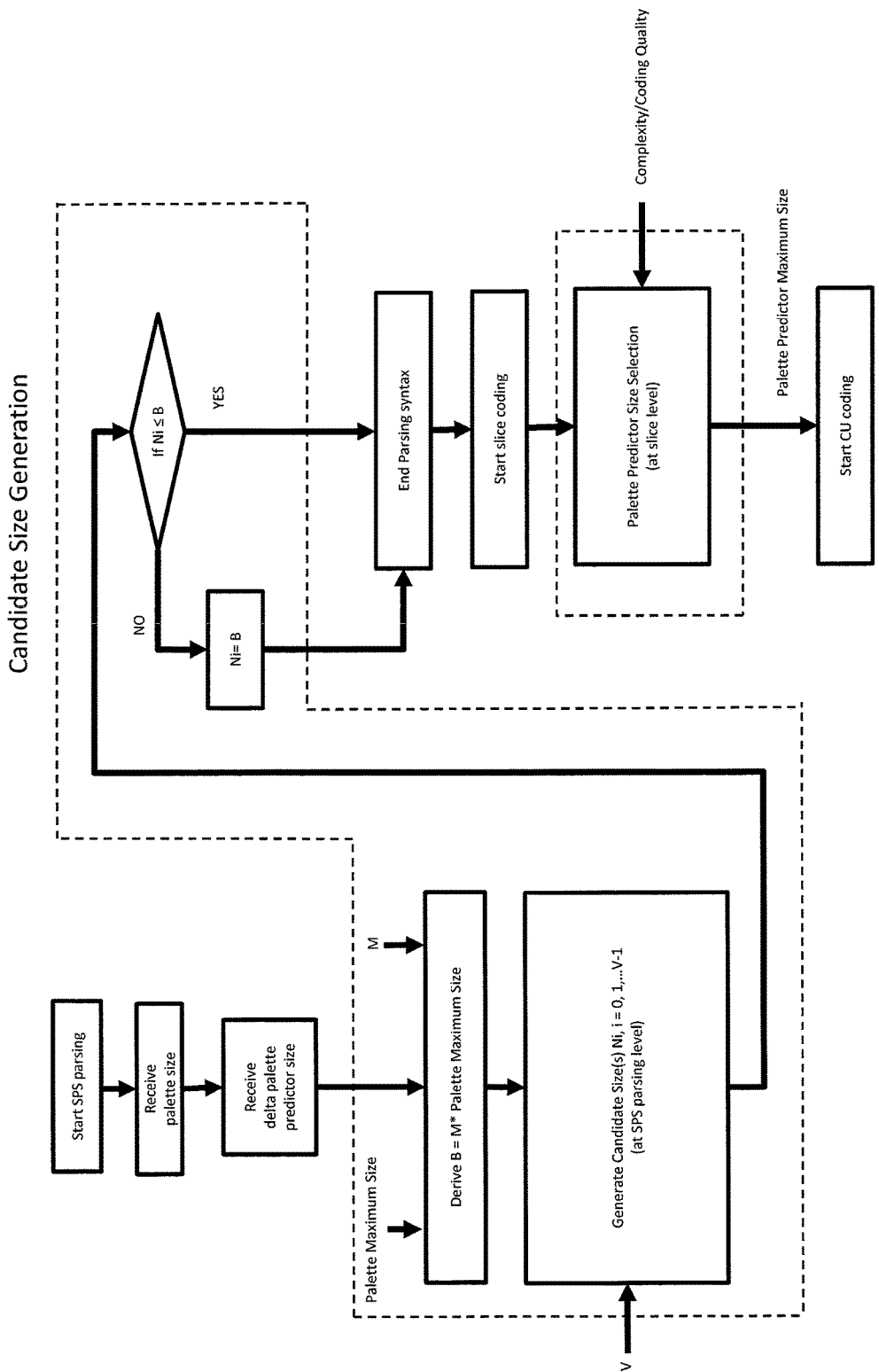
Figure 9D:
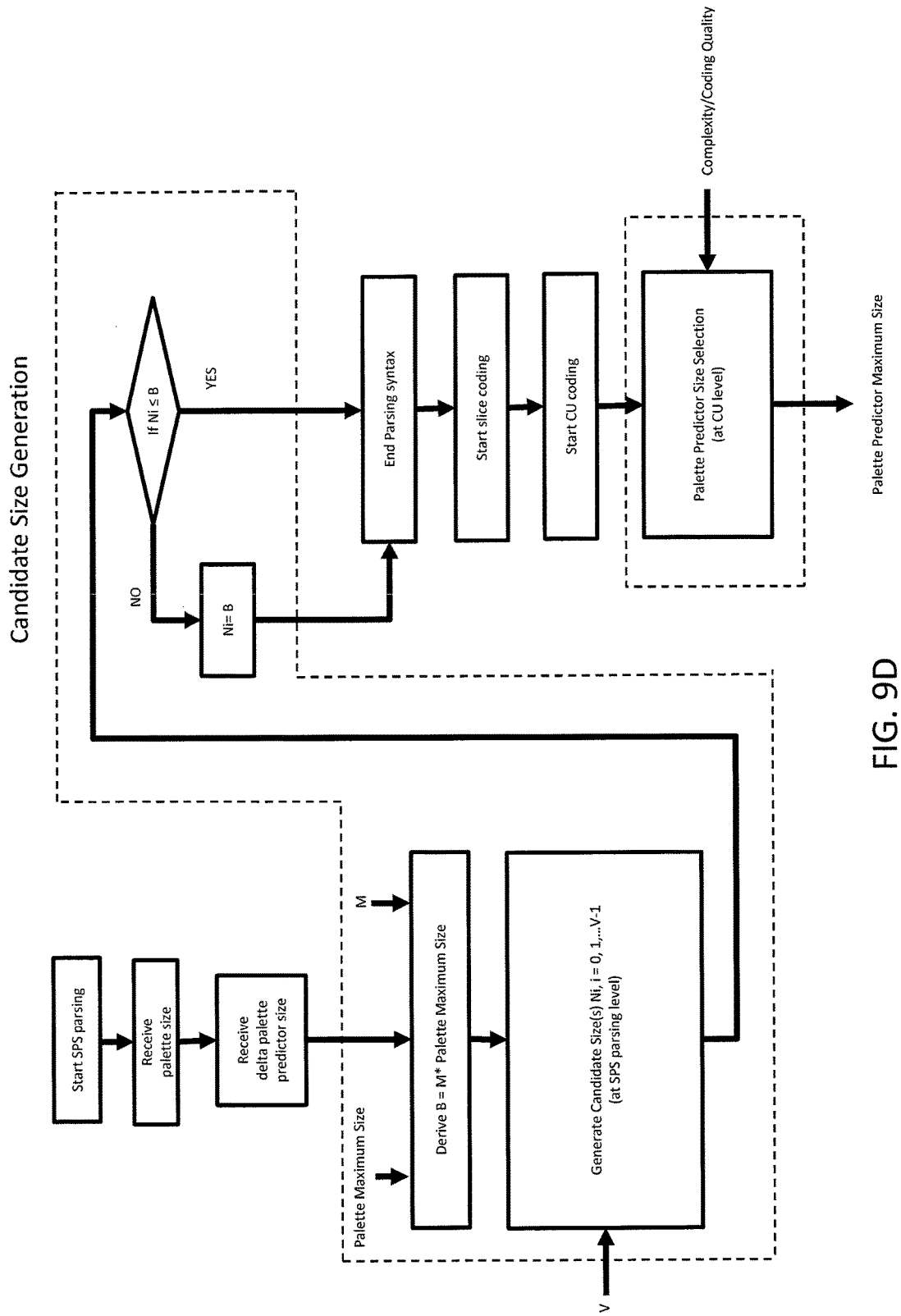

In the embodiments shown in FIGS. 8C, 8D and 8E, each of the adaptive palette predictor size selection units 80C, 80D and 80E is configured to adaptively select one candidate size from the set of candidate size(s) Ni of the adaptive palette predictor 30, based on the complexity of the video content, as the maximum size of the adaptive palette predictor 30.

In an embodiment, a size of the coding unit is set between a minimum coding unit size and a maximum coding unit size, and the complexity of the video content is determined based on at least one of the size of the coding unit of the video content, the maximum coding unit size and the minimum coding unit size, and a frame size of the video content.

In an embodiment, the complexity of the video content is determined based on the size of the coding unit of the video content, the maximum coding unit size and the minimum coding unit size.

For example, in the embodiment shown in FIG. 8C, the adaptive palette predictor size selection units 80C adaptively selects one candidate size from the set of candidate size(s) Ni of the adaptive palette predictor 30 as follows:

Palette Predictor Maximum Size=Ns,
where $$r = \left\lceil \frac{\text{Log2}(CU_{MAX}) - \text{Log2}(CU_{Min}) + 1}{V} \right\rceil$$

$$s = \left\lfloor \frac{\text{Log2}(CU) - \text{Log2}(CU_{Min})}{r} \right\rfloor$$

$1 \leq V \leq$ Maximum qp, and V is a positive integer.

In an embodiment, the complexity of the video content is the size of the coding unit of the video content, and the adaptive palette predictor size selection unit is configured to adaptively select the one candidate size from the set of candidate size(s) Ni of the adaptive palette predictor by selecting from a look-up table a size corresponding to the size of the coding unit of the video content.

For example, in the embodiment shown in FIG. 8D, the adaptive palette predictor size selection units 80D adaptively selects one candidate size from the set of candidate size(s) Ni of the adaptive palette predictor 30 as follows:

Palette Predictor Maximum Size: Determined by Lookup Table mapping between the CU size and the candidate size(s) Ni.

Below is an example of the lookup table for V=4 with a mapping between different CU sizes and the candidate sizes $N_0$-$N_3$.

| CU size | Palette Predictor Maximum Size |
|---|---|
| 64 | $N_3$ (127) |
| 32 | $N_2$ (64) |
| 16 | $N_1$ (32) |
| 8 | $N_0$ (16) |

In an embodiment, the complexity of the video content is the frame size of the video content, and the adaptive palette predictor size selection unit is configured to adaptively select the one candidate size from the set of candidate size(s) Ni of the adaptive palette predictor by selecting from a look-up table a size corresponding to the frame size of the video content.

For example, in the embodiment shown in FIG. 8E, the adaptive palette predictor size selection units 80E adaptively selects one candidate size from the set of candidate size(s) Ni of the adaptive palette predictor 30 as follows:

Palette Predictor Maximum Size: Determined by Lookup Table mapping between the CU size and the candidate size(s) Ni.

Below is an example of the lookup table for V=3 with a mapping between different frame sizes and the candidate sizes $N_0$-$N_2$.

| Frame size | Palette Predictor Maximum Size |
|---|---|
| 8K | $N_2$ (511) |
| 4K | $N_1$ (255) |
| Full HD | $N_0$ (127) |

In an embodiment, the encoder or decoder 40 is further configured to encode or decode a current coding unit of the video content in the palette coding mode using the adaptive palette predictor 30 that is derived from all palette(s) of previously encoded or decoded coding unit(s) of the video content; and update the adaptive palette predictor 30 for a next coding unit from the adaptive palette predictor 30 for the current coding unit and the palette of the current coding unit while limiting the adaptive palette predictor 30 for the next coding unit within the maximum size.

For illustration purpose, the following examples use the candidate size generation unit 70A-1 shown in FIG. 7A-1 and the adaptive palette predictor size selection unit 80A shown in FIG. 8A to illustrate how a set of candidate size(s) $N_i$ (i=0, 1, . . . , V−1) of the adaptive palette predictor is generated and how the maximum size of the adaptive palette predictor is selected from the set of candidate size(s) $N_i$.

EXAMPLE 1

V=1, M=2, Palette Maximum Size=Palette Size=Delta Palette Predictor Size=64; Maximum qp=52, qp=Any Value≤Maximum qp In this example, since V=1, in the candidate size generation process, the candidate size generation unit 70A-1 will generate only one candidate size, i.e., $N_0$, of the adaptive palette predictor 30.

$$N_0 = g(p, d, i, V) = p + d \times \left(i - \left\lceil \frac{V}{2} \right\rceil + 1\right) =$$
$$64 + 64 + \left\lfloor \frac{\min(2 \times 64 - 64, 64)}{1} \right\rfloor \times \left(0 - \left\lceil \frac{1}{2} \right\rceil + 1\right) =$$
$$128 + 64 \times 0 = 128.$$

For the adaptive palette predictor size selection process, since there is only one candidate size $N_0$ (128), the adaptive palette predictor size selection unit 80A will select $N_0$ (128) as the maximum size of the adaptive palette predictor 30.

In addition, the same result will be obtained as follows:

$$r = \left\lceil \frac{\text{Maximum } qp + 1}{V} \right\rceil = \left\lceil \frac{52 + 1}{1} \right\rceil = 53$$
$$s = \left\lfloor \frac{\text{Maximum } qp - qp}{r} \right\rfloor = \left\lfloor \frac{52 - qp}{53} \right\rfloor = 0$$

Palette Predictor Maximum Size=$N_S$=$N_0$.

In addition, since $N_0$ (128) is not larger than B (i.e., the upper bound of the maximum size of the adaptive palette predictor)=M* Palette Maximum Size (2*64)=128, $N_0$ (128) will be selected as the maximum size of the adaptive palette predictor 30.

EXAMPLE 2

V=3, M=2, Palette Maximum Size=Palette Size=64; Delta Palette Predictor Size=32; Maximum qp=52, qp=15

In this example, since V=3, in the candidate size generation process, the candidate size generation unit 70A-1 will generate three candidate sizes, i.e., $N_0$, $N_1$ and $N_2$, of the adaptive palette predictor 30.

$$N_0 = g(p, d, i, V) = p + d \times \left(i - \left\lceil \frac{V}{2} \right\rceil + 1\right) =$$
$$64 + 32 + \left\lfloor \frac{\min(2 \times 64 - 32, 32)}{3} \right\rfloor \times \left(0 - \left\lceil \frac{3}{2} \right\rceil + 1\right) =$$
$$96 + 10 \times (-1) = 86.$$

$$N_1 = g(p, d, i, V) = p + d \times \left(i - \left\lceil \frac{V}{2} \right\rceil + 1\right) = 64 + 32 +$$

$$\left\lfloor \frac{\min(2 \times 64 - 32, 32)}{3} \right\rfloor \times \left(1 - \left\lceil \frac{3}{2} \right\rceil + 1\right) = 96 + 10 \times (0) = 96.$$

$$N_2 = g(p, d, i, V) = p + d \times \left(i - \left\lceil \frac{V}{2} \right\rceil + 1\right) = 64 + 32 +$$

$$\left\lfloor \frac{\min(2 \times 64 - 32, 32)}{3} \right\rfloor \times \left(2 - \left\lceil \frac{3}{2} \right\rceil + 1\right) = 96 + 10 \times (1) = 106.$$

For the adaptive palette predictor size selection process, the adaptive palette predictor size selection unit 80A will select one of $N_0$ (86), $N_1$ (96) and $N_2$ (106) as the maximum size of the adaptive palette predictor 30 as follows:

$$r = \left\lceil \frac{\text{Maximum } qp + 1}{V} \right\rceil = \left\lceil \frac{52 + 1}{3} \right\rceil = 18$$
$$s = \left\lfloor \frac{\text{Maximum } qp - qp}{r} \right\rfloor = \left\lfloor \frac{52 - 15}{18} \right\rfloor = 2$$

Palette Predictor Maximum Size=$N_S$=$N_2$ (106).

In addition, since $N_2$ (106) is not larger than B (i.e., the upper bound of the maximum size of the adaptive palette predictor)=M* Palette Maximum Size (2*64)=128, $N_2$ (106) will not be capped by B and will be selected as the maximum size of the adaptive palette predictor 30.

In this example, the selecting process can also be implemented by a lookup table (LUT) as follows when applying all possible qp to the above equations:

| qp | Palette Predictor Maximum Size |
|---|---|
| 0 ≤ qp ≤ 16 | $N_2$ (106) |
| 17 ≤ qp ≤ 34 | $N_1$ (96) |
| 35 ≤ qp ≤ 52 | $N_0$ (86) |

FIGS. 9A-9D illustrate some possible arrangements of the candidate size generation process and the adaptive palette predictor size selection process in the palette coding mode in accordance with embodiments of the present invention.

In an embodiment, the candidate size generation process that is performed by the candidate size generation unit to generate the set of candidate size(s) of the adaptive palette predictor can be performed at one of the following levels: the configuration files parsing level for the encoder, and the configuration files generating level for the encoder, the syntax (parameter set) parsing level (e.g. SPS/PPS/VPS/SEI parsing level) for the decoder, the syntax (parameter set) generating level (e.g. SPS/PPS/VPS/SEI parameter set generating level) for the encoder, the frame level, the slice level, and the coding unit level, and the adaptive palette predictor size selection process that is performed by the adaptive palette predictor size selection unit to adaptively select one candidate size from the set of candidate size(s) of the adaptive palette predictor can also be performed at one of the above levels.

In an embodiment, both the candidate size generation process and the adaptive palette predictor size selection process are performed at the same level. For example, as embodied in FIG. 9A, both the candidate size generation process and the adaptive palette predictor size selection process are performed at the SPS parsing level. As embodied in FIG. 9B, both the candidate size generation process and the adaptive palette predictor size selection process are performed at the frame parsing level. Similarly, both the candidate size generation process and the adaptive palette predictor size selection process can be performed at the slice level, or at the coding unit level.

In another embodiment, the candidate size generation process and the adaptive palette predictor size selection process are performed at different levels. For example, as embodied in FIG. 9C, the candidate size generation process is performed at the SPS parsing level, and the adaptive palette predictor size selection process is performed at the slice level. As embodied in FIG. 9D, the candidate size generation process is performed at the SPS parsing level, and the adaptive palette predictor size selection process is performed at the coding unit level.

In brief, when the candidate size generation process is performed in one of the following levels: the configuration files parsing level for the encoder, and the configuration files generating level for the encoder, the syntax (parameter set) parsing level (e.g. SPS/PPS/VPS/SEI parsing level) for the decoder, the syntax (parameter set) generating level (e.g. SPS/PPS/VPS/SEI parameter set generating level) for the encoder, the frame level, the slice level, and the coding unit level, the adaptive palette predictor size selection process can be performed at the same level as the candidate size generation process or another level therebelow. For example, when the candidate size generation process is performed in the SPS parsing level, the adaptive palette predictor size selection process can be performed at the SPS parsing level, the frame level, the slice level, or the coding unit level; when the candidate size generation process is performed in the SPS frame level, the adaptive palette predictor size selection process can be performed at the frame level, the slice level, or the coding unit level, but not at the SPS parsing level, because it is higher than the frame level.

As illustrated above, since the coding units are encoded/decoded in the palette coding mode using an adaptive palette predictor with an adaptive maximum size based on the complexity of the video content and/or the coding quality of the video content, the coding efficiency will be improved/enhanced, i.e., higher hitting rate on the palette predictor, lower checking time for comparing index entries of the palette and the palette predictor, smaller memory/buffer size, lower overhead for transmitting the flags and/or unpredicted major color values.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of encoding or decoding coding units of a video content in a palette coding mode using an adaptive palette predictor, the method comprising:
adaptively determining a maximum size of the adaptive palette predictor; and
encoding or decoding the coding units of the video content in the palette coding mode using the adaptive palette predictor while limiting the adaptive palette predictor that is derived from all palette(s) of previously encoded or decoded coding unit(s) of the video content within the maximum size determined in the adaptively determining step,
wherein a palette size of the coding units is equal to or less than a palette maximum size, and
wherein the adaptively determining step includes:
generating a set of candidate size(s) Ni (i=0, 1, . . . , V−1) of the adaptive palette predictor based on at least V, M, and the palette maximum size, wherein V is an integer and V≥1, M≥1, and Ni≥the palette maximum size and Ni is capped at an upper bound that is set based on M and the palette maximum size if Ni is larger than the upper bound.

2. The method of claim 1, wherein the adaptively determining step further includes:
adaptively selecting one candidate size from the set of candidate size(s) Ni of the adaptive palette predictor as a maximum size of the adaptive palette predictor.

3. The method of claim 1, wherein when M is an integer, the upper bound is set to be M* the palette maximum size.

4. The method of claim 1, wherein the step of generating the set of candidate size(s) of the adaptive palette predictor is further based on a delta palette predictor size and the palette size.

5. The method of claim 2, wherein a size of the coding unit is set between a minimum coding unit size; and
the step of adaptively selecting the one candidate size from the set of candidate size(s) Ni of the adaptive palette predictor includes selecting from a look-up table a size corresponding to the size of the coding unit of the video content or a frame size of the video content.

6. The method of claim 2, wherein the step of adaptively selecting the one candidate size from the set of candidate size(s) Ni of the adaptive palette predictor includes selecting from a look-up table a size corresponding to a current quantization parameter of a coding unit level, a slice level, a frame level, a syntax (parameter set) parsing level, a syntax (parameter set) generating level, a configuration files parsing level, or a configuration files generating level of the video content.

7. The method of claim 2, wherein
the step of generating the set of candidate size(s) of the adaptive palette predictor is performed at one of a configuration files generating level, a configuration files parsing level, a syntax (parameter set) generating level, a syntax (parameter set) parsing level, a frame level, a slice level, and a coding unit level, and
the step of adaptively selecting the one candidate size from the set of candidate size(s) Ni of the adaptive palette predictor is performed at the same one or another one of the configuration files generating level, the configuration files parsing level, the syntax (parameter set) generating level, the syntax (parameter set) parsing level, the frame level, the slice level, and the coding unit level.

8. The method of claim 1, wherein the step of encoding or decoding the coding units of the video content in the palette coding mode using the adaptive palette predictor while limiting the adaptive palette predictor within the maximum size includes:
encoding or decoding a current coding unit of the video content in the palette coding mode using the adaptive palette predictor that is derived from all palette(s) of previously encoded or decoded coding unit(s) of the video content; and
updating the adaptive palette predictor for a next coding unit from the adaptive palette predictor for the current coding unit and the palette of the current coding unit while limiting the adaptive palette predictor for the next coding unit within the maximum size.

9. An apparatus for encoding or decoding coding units of a video content in a palette coding mode using an adaptive palette predictor, the apparatus comprising:
a memory device storing the adaptive palette predictor;

an adaptive palette predictor size determination unit configured to adaptively determine a maximum size of the adaptive palette predictor; and an encoder or decoder configured to encode or decode the coding units of the video content in the palette coding mode using the adaptive palette predictor stored in the memory device while limiting the adaptive palette predictor that is derived from all palette(s) of previously encoded or decoded coding unit(s) of the video content within the maximum size provided by the adaptive palette predictor size determination unit, wherein a palette size of the coding units is equal to or less than a palette maximum size, and wherein the adaptive palette predictor size determination unit includes:

a candidate size generation unit configured to generate a set of candidate size(s) $N_i$ ($i=0, 1, \ldots, V-1$) of the adaptive palette predictor based on at least V, M, and the palette maximum size, wherein V is an integer and $V \geq 1$, $M \geq 1$, and $N_i \geq$ the palette maximum size and $N_i$ is capped at an upper bound that is set based on M and the palette maximum size if $N_i$ is larger than the upper bound.

10. The apparatus of claim 9, wherein the adaptive palette predictor size determination unit further includes:

an adaptive palette predictor size selection unit configured to adaptively select one candidate size from the set of candidate size(s) $N_i$ of the adaptive palette predictor as the maximum size of the adaptive palette predictor.

11. The apparatus of claim 9, wherein when M is an integer, the upper bound is set to be M* the palette maximum size.

12. The apparatus of claim 9, wherein the candidate size generation unit is configured to generate the set of candidate size(s) of the adaptive palette predictor further based on a delta palette predictor size and the palette size.

13. The apparatus of claim 10, wherein a size of the coding unit is set between a minimum coding unit size and a maximum coding unit size, and the adaptive palette predictor size selection unit is configured to adaptively select the one candidate size from the set of candidate size(s) $N_i$ of the adaptive palette predictor by selecting from a look-up table a size corresponding to the size of the coding unit of the video content or a frame size of the video content.

14. The apparatus of claim 10, wherein the adaptive palette predictor size selection unit is configured to adaptively select the one candidate size from the set of candidate size(s) $N_i$ of the adaptive palette predictor by selecting from a look-up table a size corresponding to a current quantization parameter of a coding unit level, a slice level, a frame level, a syntax (parameter set) parsing level, a syntax (parameter set) generating level, a configuration files parsing level, or a configuration files generating level of the video content.

15. The apparatus of claim 10, wherein the candidate size generation unit is configured to generate the set of candidate size(s) $N_i$ of the adaptive palette predictor at one of a configuration files generating level, a configuration files parsing level, a syntax (parameter set) generating level, a syntax (parameter set) parsing level, a frame level, a slice level, and a coding unit level, and the adaptive palette predictor size selection unit is configured to adaptively select the one candidate size from the set of candidate size(s) $N_i$ of the adaptive palette predictor at the same one or another one of the configuration files generating level, the configuration files parsing level, the syntax (parameter set) generating level, the syntax (parameter set) parsing level, the frame level, the slice level, and the coding unit level.

16. The apparatus of claim 9, wherein the encoder or decoder is further configured to encode or decode a current coding unit of the video content in the palette coding mode using the adaptive palette predictor that is derived from all palette(s) of previously encoded or decoded coding unit(s) of the video content; and update the adaptive palette predictor for a next coding unit from the adaptive palette predictor for the current coding unit and the palette of the current coding unit while limiting the adaptive palette predictor for the next coding unit within the maximum size.

17. The method of claim 1, wherein V=1, M=2, the palette maximum size=64 and the maximum size of the adaptive palette predictor is 128.

18. The apparatus of claim 9, wherein V=1, M=2, the palette maximum size=64 and the maximum size of the adaptive palette predictor is 128.

* * * * *